United States Patent
Kim et al.

(10) Patent No.: US 10,458,531 B2
(45) Date of Patent: Oct. 29, 2019

(54) PLANETARY GEAR TRAIN OF AUTOMATIC TRANSMISSION FOR VEHICLE

(71) Applicants: HYUNDAI MOTOR COMPANY, Seoul (KR); KIA MOTORS CORPORATION, Seoul (KR)

(72) Inventors: Jong Soo Kim, Seoul (KR); Dong Hwan Hwang, Seoul (KR); Jong Sool Park, Hwaseong-si (KR); Kyeong Hun Lee, Seoul (KR); Jin Ho Kim, Suwon-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 86 days.

(21) Appl. No.: 15/830,704

(22) Filed: Dec. 4, 2017

(65) Prior Publication Data
US 2018/0163831 A1 Jun. 14, 2018

(30) Foreign Application Priority Data
Dec. 14, 2016 (KR) ........................ 10-2016-0170771

(51) Int. Cl.
*F16H 37/04* (2006.01)
*F16H 3/66* (2006.01)

(52) U.S. Cl.
CPC ............. *F16H 37/04* (2013.01); *F16H 3/666* (2013.01); *F16H 2037/048* (2013.01); *F16H 2200/0065* (2013.01); *F16H 2200/2012* (2013.01); *F16H 2200/2046* (2013.01); *F16H 2200/2097* (2013.01)

(58) Field of Classification Search
CPC .... F16H 37/04; F16H 3/666; F16H 2037/048; F16H 2200/0065; F16H 2200/2012; F16H 2200/2046; F16H 2200/2097
USPC .................................................. 475/271, 275
See application file for complete search history.

(56) References Cited

U.S. PATENT DOCUMENTS

| | | | | |
|---|---|---|---|---|
| 6,984,187 B2 * | 1/2006 | Biermann | ................. | F16H 3/66 475/215 |
| 8,251,857 B1 * | 8/2012 | Mellet | ..................... | F16H 3/666 475/280 |
| 8,721,488 B2 * | 5/2014 | Mellet | ..................... | F16H 3/725 475/276 |
| 9,777,804 B2 * | 10/2017 | Lee | .......................... | F16H 3/66 |
| 9,850,987 B2 * | 12/2017 | Lee | .......................... | F16H 3/66 |
| 9,897,176 B2 * | 2/2018 | Lee | ........................ | F16H 3/666 |
| 9,951,848 B2 * | 4/2018 | Lee | ......................... | F16H 3/663 |
| 10,047,835 B2 * | 8/2018 | Kim | .......................... | F16H 3/66 |
| 10,107,364 B2 * | 10/2018 | Lee | ........................... | F16H 3/66 |
| 10,145,452 B2 * | 12/2018 | Lee | ........................... | F16H 3/66 |

\* cited by examiner

*Primary Examiner* — Leslie A Nicholson, III
(74) *Attorney, Agent, or Firm* — Brinks Gilson & Lione

(57) ABSTRACT

A planetary gear train of an automatic transmission includes a main shifting portion having three planetary gear sets arranged on an input shaft, an auxiliary shifting portion having one planetary gear set arranged on an output shaft, eleven shafts respectively connected with corresponding rotational elements of the four planetary gear sets, and two transfer gears respectively forming external gear-engagement between the main and auxiliary shifting portions.

20 Claims, 4 Drawing Sheets

FIG. 2

| Shift-stage | Clutch | | | | Brake | | Gear ratio | Step ratio | Remark |
|---|---|---|---|---|---|---|---|---|---|
| | C1 | C2 | C3 | C4 | B1 | B2 | | | |
| REV | | | | ● | ● | ● | -4.19 | – | |
| N | | | | ● | | ● | – | – | |
| D1 | ● | | ● | | | ● | 5.12 | | |
| D2 | ● | ● | ● | | | ● | 3.15 | 1.62 | |
| D3 | ● | ● | | | | ● | 2.14 | 1.47 | |
| D4 | ● | ● | | ● | | ● | 1.63 | 1.31 | Gear ratio span :8.79 |
| D5 | ● | ● | | ● | | | 1.25 | 1.31 | |
| D6 | ● | | ● | | | | 1.01 | 1.24 | |
| D7 | ● | | ● | ● | | | 0.87 | 1.16 | R/D1 ratio :-0.82 |
| D8 | ● | | ● | | ● | | 0.71 | 1.22 | |
| D9 | ● | | | ● | ● | | 0.58 | 1.22 | |

PLANETARY GEAR TRAIN OF AUTOMATIC TRANSMISSION FOR VEHICLE

CROSS-REFERENCE TO RELATED APPLICATION

This application claims priority to and the benefit of Korean Patent Application No. 10-2016-0170771, filed on Dec. 14, 2016, which is incorporated herein by reference in its entirety.

FIELD

The present disclosure relates to an automatic transmission for a vehicle.

BACKGROUND

The statements in this section merely provide background information related to the present disclosure and may not constitute prior art.

Recently, increase of oil price leads more competition for improving fuel efficiency of a vehicle.

In this sense, research on an automatic transmission has been performed to simultaneously provide better drivability and fuel consumption by achieving more shift stages.

In order to achieve more shift stages for an automatic transmission, the number of parts is typically increased. This negatively affects installability, production cost, weight and/or power flow efficiency.

Therefore, in order to enhance fuel efficiency and to lower manufacturing cost of an automatic transmission via multiple shift stages, it is important to reduce number of parts of the transmission. In this respect, an eight-speed automatic transmission has been recently introduced to perform more shift stages via planetary gear trains for an automatic transmission.

However, we have discovered that disclosed automatic transmissions of eight or more shift-stages typically includes many components and thus may easily become lengthy.

The above information disclosed in this Background section is only for enhancement of understanding of the background of the present disclosure and therefore it may contain information that does not form the prior art that is already known to a person of ordinary skill in the art.

SUMMARY

The present disclosure provides a planetary gear train of an automatic transmission for a vehicle having advantages of realizing at least nine forward speeds and at least one reverse speed by a combination of four planetary gear sets, two external gears and six engagement elements, thereby providing improvement of power delivery performance and fuel consumption and improving installability by reducing a length.

In addition, a wide available range of varying gear teeth of transfer gears enables easily obtaining desired gear ratios for respective vehicles, thereby improving power delivery performance and fuel consumption.

In one form of the present disclosure, a planetary gear train includes: a first planetary gear set having first, second, and third rotational elements, a second planetary gear set having fourth, fifth, and sixth rotational elements, a third planetary gear set having seventh, eighth, and ninth rotational elements, a fourth planetary gear set having tenth, eleventh, and twelfth rotational elements, a first externally-engaged gear set having thirteenth and fourteenth rotational elements, a second externally-engaged gear set having fifteenth and sixteenth rotational elements, an input shaft disposed coaxial with the first, second, and third planetary gear sets, and an output shaft disposed in parallel with the input shaft and coaxial with the fourth planetary gear set.

The second rotational element may be fixedly connected with the input shaft, the fourth rotational element and the seventh rotational elements may be connected with the tenth rotational element through the second externally-engaged gear set, the sixth rotational element may be connected with the eleventh rotational element through the first externally-engaged gear set, and the eleventh rotational element being fixedly connected with the output shaft.

The exemplary planetary gear train may further include: a first shaft fixedly connected with the first rotational element and fixedly connected with a transmission housing, a second shaft fixedly connected with the second rotational element and the input shaft, a third shaft fixedly connected with the third rotational element, a fourth shaft fixedly connected with the fourth rotational element, the seventh rotational element, and the fifteenth rotational element, a fifth shaft fixedly connected with the fifth rotational element, a sixth shaft fixedly connected with the sixth rotational element and the thirteenth rotational element, a seventh shaft fixedly connected with the eighth rotational element, an eighth shaft fixedly connected with the ninth rotational element, a ninth shaft fixedly connected with the tenth rotational element and the sixteenth rotational element, a tenth shaft fixedly connected with the eleventh rotational element, the fourteenth rotational element, and the output shaft, and an eleventh shaft fixedly connected with the twelfth rotational element.

In the exemplary planetary gear train, the second shaft may be selectively connected with the fifth shaft and the eighth shaft respectively, the third shaft may be selectively connected with the seventh shaft, the eighth shaft may be selectively connected with a transmission housing, and the eleventh shaft may be selectively connected with the transmission housing.

In the exemplary planetary gear train, two shafts selected from the fourth shaft, the seventh shaft, and the eighth shaft may be selectively interconnected, such that the third planetary gear set may integrally rotates when the selected two shafts are connectedly operated.

The exemplary planetary gear train may further include: a first clutch arranged between the second shaft and the fifth shaft, a second clutch arranged between the second shaft and the eighth shaft, a third clutch arranged between the fourth shaft and the seventh shaft, a fourth clutch arranged between the third shaft and the seventh shaft, a first brake arranged between the eighth shaft and the transmission housing, and a second brake arranged between the eleventh shaft and the transmission housing.

In one form, the exemplary planetary gear train may further include: a first clutch arranged between the second shaft and the fifth shaft, a second clutch arranged between the second shaft and the eighth shaft, a third clutch arranged between the fourth shaft and the eighth shaft, a fourth clutch arranged between the third shaft and the seventh shaft, a first brake arranged between the eighth shaft and the transmission housing, and a second brake arranged between the eleventh shaft and the transmission housing.

In another form, the exemplary planetary gear train may further include: a first clutch arranged between the second shaft and the fifth shaft, a second clutch arranged between the second shaft and the eighth shaft, a third clutch arranged between the seventh shaft and the seventh shaft, a fourth clutch arranged between the third shaft and the seventh shaft, a first brake arranged between the eighth shaft and the transmission housing, and a second brake arranged between the eleventh shaft and the transmission housing.

The first planetary gear set may include: a first sun gear as the first rotational element, a first planet carrier as the second rotational element, and a first ring gear as the third rotational element. The second planetary gear set may include a second sun gear as the fourth rotational element, a second planet carrier as the fifth rotational element, and a second ring gear as the sixth rotational element. The third planetary gear set may include a third sun gear as the seventh rotational element, a third planet carrier as the eighth rotational element, and a third ring gear as the ninth rotational element. The fourth planetary gear set may include a fourth sun gear as the tenth rotational element, a fourth planet carrier as the eleventh rotational element, and a fourth ring gear as the twelfth rotational element.

In the exemplary planetary gear train, the first planetary gear set may be a double pinion planetary gear set, the second planetary gear set may be a single pinion planetary gear set, the third planetary gear set may be a double pinion planetary gear set, and the fourth planetary gear set may be a single pinion planetary gear set.

According to a planetary gear train according to an exemplary form of the present disclosure, planetary gear sets are dividedly arranged on input and output shafts disposed in parallel, thereby reducing a length and improving installability.

According to a planetary gear train according to an exemplary form of the present disclosure, at least eight forward speeds and at least one reverse speed may be realized by employing two transfer gears in addition to a combination of planetary gear sets, thereby providing a wide range of varying gear teeth so as to easily achieve desired gear ratio and to easily comply with desired performance for respective vehicles.

In addition, according to a planetary gear train according to an exemplary form of the present disclosure, a gear ratio span of more than 8.7 may be achieved while realizing at least nine forward speeds and at least one reverse speed, thereby increasing an engine driving efficiency.

In addition, the linearity of step ratios of shift stages is secured while multi-staging the shift stage with high efficiency, thereby making it possible to improve drivability such as acceleration before and after a shift, an engine speed rhythmic sense, and the like.

Further, effects that can be obtained or expected from exemplary forms of the present disclosure are directly or suggestively described in the following detailed description. That is, various effects expected from exemplary forms of the present disclosure will be described in the following detailed description.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which:

FIG. 2 is an operational chart for respective engagement elements at respective shift-stages in a planetary gear train according to a first exemplary form of the present disclosure;

Figure 1:
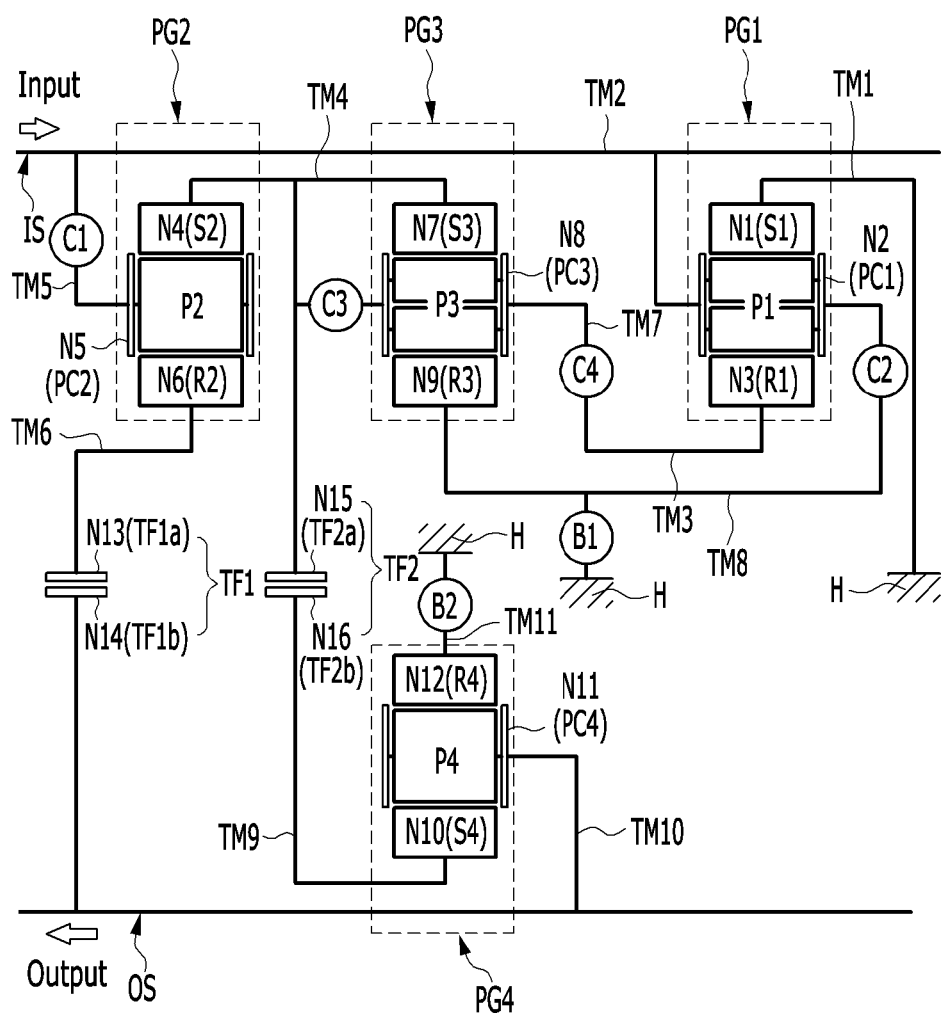
FIG. 1 is a schematic diagram of a planetary gear train according to a first exemplary form of the present disclosure.

The drawings described herein are for illustration purposes only and are not intended to limit the scope of the present disclosure in any way.

DETAILED DESCRIPTION

The present disclosure will be described more fully hereinafter with reference to the accompanying drawings, in which exemplary forms of the disclosure are shown. As those skilled in the art would realize, the described forms may be modified in various different ways, all without departing from the spirit or scope of the present disclosure.

The drawings and description are to be regarded as illustrative in nature and not restrictive, and like reference numerals designate like elements throughout the present disclosure.

In the following description, dividing names of components into first, second and the like is to divide the names because the names of the components are the same as each other and an order thereof is not particularly limited.

In the following description, various members are described as being connected, which may include members that are directly connected, fixedly connected, selectively connected or operably connected. In the drawings, various members are shown as being directly connected for movement together, and thus includes members that are fixedly connected.

FIG. 1 is a schematic diagram of a planetary gear train according to a first exemplary form of the present disclosure.

Referring to FIG. 1, a planetary gear train includes: an input shaft IS, an output shaft OS, first, second, third, and fourth planetary gear sets PG1, PG2, PG3, and PG4, first and second transfer gears TF1 and TF2 as first and second externally-engaged gear sets, and engagement elements of four clutches C1, C2, C3, and C4 and two brakes B1 and B2.

The input shaft IS is an input member and the torque from a crankshaft of an engine is input into the input shaft IS, after being torque-converted through a torque converter.

The output shaft OS is an output member, and, arranged in parallel with the input shaft IS, outputs a shifted driving torque to a drive shaft through a differential apparatus.

The first, second, and third planetary gear sets PG1, PG2, and PG3 are arranged at external circumference of the input shaft IS and form a main shifting portion. With the third planetary gear set PG3 being centrally located, the second planetary gear set PG2 is arranged toward an engine side, i.e., an input side, and the first planetary gear set PG1 is arranged opposite to the engine side.

The fourth planetary gear set PG4 is arranged at external circumference of the output shaft OS disposed in parallel with the input shaft IS and forms an auxiliary shifting portion.

The first planetary gear set PG1 is a double pinion planetary gear set, and includes a first sun gear S1, a first planet carrier PC1 that rotatably supports a first pinion P1 externally gear-meshed with the first sun gear S1, and a first ring gear R1 that is internally engaged with the first pinion P1. The first sun gear S1 acts as a first rotational element N1, the first planet carrier PC1 acts as a second rotational element N2, and the first ring gear R1 acts as a third rotational element N3.

The second planetary gear set PG2 is a single pinion planetary gear set, and includes a second sun gear S2, a second planet carrier PC2 that supports second pinion P2 externally engaged with the second sun gear S2, and a second ring gear R2 that is internally engaged with the second pinion P2. The second sun gear S2 acts as a fourth rotational element N4, the second planet carrier PC2 acts as a fifth rotational element N5, and the second ring gear R2 acts as a sixth rotational element N6.

The third planetary gear set PG3 is a double pinion planetary gear set, and includes a third sun gear S3, a third planet carrier PC3 that rotatably supports a third pinion P3 externally gear-meshed with the third sun gear S3, and a third ring gear R3 that is internally gear-meshed with the third pinion P3. The third sun gear S3 acts as a seventh rotational element N7, the third planet carrier PC3 acts as an eighth rotational element N8, and the third ring gear R3 acts as a ninth rotational element N9.

The fourth planetary gear set PG4 is a single pinion planetary gear set, and includes a fourth sun gear S4, a fourth planet carrier PC4 that supports fourth pinion P4 externally engaged with the fourth sun gear S4, and a fourth ring gear R4 that is internally engaged with the fourth pinion P4. The fourth sun gear S4 acts as a tenth rotational element N10, the fourth planet carrier PC4 acts as an eleventh rotational element N11, and the fourth ring gear R4 acts as a twelfth rotational element N12.

In the arrangement of the first, second, and third planetary gear sets PG1, PG2, and PG3, the fourth rotational element N4 is directly connected with the seventh rotational element N7, and eight shafts TM1 to TM8 are formed.

Three shafts TM9 to TM11 are connected to the fourth planetary gear set PG4.

The eleven shafts TM1 to TM11 are hereinafter described in detail.

The first shaft TM1 is fixedly connected with the first rotational element N1 (first sun gear S1), and fixedly connected with the transmission housing H, thereby always acting as a fixed element.

The second shaft TM2 is fixedly connected with the second rotational element N2 (first planet carrier PC1), and directly connected with the input shaft IS, thereby always acting as an input element.

The third shaft TM3 is fixedly connected with the third rotational element N3 (first ring gear R1)

The fourth shaft TM4 is fixedly connected with the fourth rotational element N4 (second sun gear S2) and the seventh rotational element N7 (third sun gear S3).

The fifth shaft TM5 is fixedly connected with the fifth rotational element N5 (second planet carrier PC2), and selectively connected with the second shaft TM2.

The sixth shaft TM6 is fixedly connected with the sixth rotational element N6 (second ring gear R2).

The seventh shaft TM7 is fixedly connected with the eighth rotational element N8 (third planet carrier PC3), and selectively connected with the second shaft TM2 and the fourth shaft TM4.

The eighth shaft TM8 is fixedly connected with the ninth rotational element N9 (third ring gear R3), selectively connected with the second shaft TM2, and selectively connected with the transmission housing H, thereby selectively acting as a fixed element.

The ninth shaft TM9 is fixedly connected with the tenth rotational element N10 (fourth sun gear S4), and externally gear-meshed with the fourth shaft TM4.

The tenth shaft TM10 is fixedly connected with the eleventh rotational element N11 (fourth planet carrier PC4), externally gear-meshed with the sixth shaft TM6, and fixedly connected with the output shaft OS, thereby always acting as an output element.

The eleventh shaft TM11 is fixedly connected with the twelfth rotational element N12 (fourth ring gear R4), and selectively connected with the transmission housing H, thereby selectively acting as a fixed element.

The first and second transfer gears TF1 and TF2 formed as externally-engaged gear sets deliver a shifted torque of the main shifting portion having the first, second, and third planetary gear sets PG1, PG2, and PG3 to the auxiliary shifting portion having the fourth planetary gear set PG4.

The first transfer gear TF1 includes a first transfer drive gear TF1a and a first transfer driven gear TF1b that are externally gear-meshed with each other. The first transfer drive gear TF1a acts as a thirteenth rotational element N13 fixedly connected with the sixth shaft TM6, and the first transfer driven gear TF1 b acts as a fourteenth rotational element N14 fixedly connected with the tenth shaft TM10. Thereby, the sixth shaft TM6 and the tenth shaft TM10 are externally gear-meshed with each other through the first transfer gear TF1.

The second transfer gear TF2 includes a second transfer drive gear TF2a and a second transfer driven gear TF2b that are externally gear-meshed with each other. The second transfer drive gear TF2a acts as a fifteenth rotational element N15 fixedly connected with the fourth shaft TM4, and the second transfer driven gear TF2b acts as a sixteenth rotational element N16 fixedly connected with the ninth shaft TM9. Thereby, the fourth shaft TM4 and the ninth shaft TM9 are externally gear-meshed with each other through the second transfer gear TF2.

As a result, respective shafts externally gear-meshed by the first or second transfer gear TF1 or TF2 rotate in opposite directions, and the gear ratios of the first and second transfer gears TF1 and TF2 may be preset in consideration of desired speed ratio of the transmission.

Each of the eleven shafts TM1 to TM11 may be a rotational member that fixedly interconnects the input and output shafts and rotational elements of the planetary gear sets PG1, PG2, PG3, and PG4, or may be a rotational member that selectively interconnects a rotational element to the transmission housing H, or may be a fixed member fixed to the transmission housing H.

In the disclosure, when two or more members are described to be "fixedly connected", where the member may be any of a shaft, an input shaft, an output shaft, a rotational member, and a transmission housing, it means that the fixedly connected members always rotate together at a same speed.

When two or more members are described to be "selectively connected" by an engagement element, it means that the selectively connected members rotate separately when the engagement element is not engaged, and rotate together at a same speed when the engagement element is engaged.

The engagement elements include the four clutches C1, C2, C3, and C4 and the two brakes B1 and B2, and are arranged as follows.

The first clutch C1 is arranged between the second shaft TM2 and the fifth shaft TM5, such that the second shaft TM2 and the fifth shaft TM5 may selectively become integral.

The second clutch C2 is arranged between the second shaft TM2 and the eighth shaft TM8, such that the second shaft TM2 and the eighth shaft TM8 may selectively become integral.

The third clutch C3 is arranged between the fourth shaft TM4 and the seventh shaft TM7, such that the fourth shaft TM4 and the seventh shaft TM7 may selectively become integral.

The fourth clutch C4 is arranged between the third shaft TM3 and the seventh shaft TM7, such that the third shaft TM3 and the seventh shaft TM7 may selectively become integral.

The first brake B1 is arranged between the eighth shaft TM8 and the transmission housing H, such that the eighth shaft TM8 may selectively act as a fixed element.

The second brake B2 is arranged between the eleventh shaft TM11 and the transmission housing H, such that the eleventh shaft TM11 may selectively act as a fixed element.

The third clutch C3 enables the third planetary gear set PG3 to integrally rotate, and for such a purpose the third clutch C3 is described to selectively connect the fourth shaft TM4 and the seventh shaft TM7, in the first exemplary form. It will be obviously understood that the same function and result may achieved by selectively connecting two of the seventh, eighth, and ninth rotational elements N7, N8, and N9, or alternatively, by selectively connecting two shafts of the fourth shaft TM4, the seventh shaft TM7, and the eighth shaft TM8.

The engagement elements of the first, second, third, and fourth clutches C1, C2, C3, and C4 and the first and second brakes B1 and B2 may be realized as multi-plate hydraulic pressure friction devices that are frictionally engaged by hydraulic pressure, however, it should not be understood to be limited thereto, since various other configurations that are electrically controllable may be available.

FIG. 2 is an operational chart for respective engagement elements at respective shift-stages in a planetary gear train according to a first exemplary form of the present disclosure.

Referring to FIG. 2, a planetary gear train according to a first exemplary form of the present disclosure realizes shifting by operating three engagement elements among the four clutches C1, C2, C3, and C4 and the two brakes B1 and B2.

[The Forward First Speed]

In the forward first speed D1, the third and fourth clutches C3 and C4 and the second brake B2 are simultaneously operated.

As a result, the third planetary gear set PG3 integrally rotates by the operation of the third clutch C3, the third shaft TM3 is connected with the seventh shaft TM7 by the operation of the fourth clutch C4, and the torque of the input shaft IS is input to the second shaft TM2.

Then, the first shaft TM1 acts as a fixed element, and the eleventh shaft TM11 acts as a fixed element by the operation of the second brake B2, thereby realizing the forward first speed by cooperative operation of respective shafts and outputting a shifted torque to the output shaft OS fixedly connected with the tenth shaft TM10.

[The Forward Second Speed]

In the forward second speed D2, the second and third clutches C2 and C3 and the second brake B2 are simultaneously operated.

As a result, the third planetary gear set PG3 integrally rotates by the operation of the third clutch C3, the second shaft TM2 is connected with the eighth shaft TM8 by the operation of the second clutch C2, and the torque of the input shaft IS is input to the second shaft TM2.

Then, the first shaft TM1 acts as a fixed element, and the eleventh shaft TM11 acts as a fixed element by the operation of the second brake B2, thereby realizing the forward second speed by cooperative operation of respective shafts and outputting a shifted torque to the output shaft OS fixedly connected with the tenth shaft TM10.

[The Forward Third Speed]

In the forward third speed D3, the second and fourth clutches C2 and C4 and the second brake B2 are simultaneously operated.

As a result, the second shaft TM2 is connected with the eighth shaft TM8 by the operation of the second clutch C2, the third shaft TM3 is connected with the seventh shaft TM7 by the operation of the fourth clutch C4, and the torque of the input shaft IS is input to the second shaft TM2.

Then, while the TM1 is always acting as a fixed element, the eleventh shaft TM11 acts as a fixed element by the operation of the second brake B2, thereby realizing the forward third speed by cooperative operation of respective shafts and outputting a shifted torque to the output shaft OS fixedly connected with the tenth shaft TM10.

[The Forward Fourth Speed]

In the forward fourth speed D4, the first and second clutch C1 and C2 and the second brake B2 are simultaneously operated.

As a result, the second shaft TM2 is connected with the fifth shaft TM5 by the operation of the first clutch C1, the second shaft TM2 is connected with the eighth shaft TM8 by the operation of the second clutch C2, and the torque of the input shaft IS is input to the second shaft TM2 and the fifth shaft TM5.

Then, while the TM1 is always acting as a fixed element, the eleventh shaft TM11 acts as a fixed element by the operation of the second brake B2, thereby realizing the forward fourth speed by cooperative operation of respective shafts and outputting a shifted torque to the output shaft OS fixedly connected with the tenth shaft TM10.

In addition, the forward fourth speed D4 may be realized by simultaneously operating the first and fourth clutches C1 and C4 and the second brake B2.

In this case, the second shaft TM2 is connected with the fifth shaft TM5 by the operation of the first clutch C1, the third shaft TM3 is connected with the seventh shaft TM7 by the operation of the fourth clutch C4, and the torque of the input shaft IS is input to the second shaft TM2 and the fifth shaft TM5.

Then, while the TM1 is always acting as a fixed element, the eleventh shaft TM11 acts as a fixed element by the operation of the second brake B2, thereby realizing the forward fourth speed by cooperative operation of respective shafts and outputting a shifted torque to the output shaft OS fixedly connected with the tenth shaft TM10.

[The Forward Fifth Speed]

In the forward fifth speed D5, the first, second, and fourth clutches C1, C2, and C4 are simultaneously operated.

As a result, the second shaft TM2 is connected with the fifth shaft TM5 by the operation of the first clutch C1, the second shaft TM2 is connected with the eighth shaft TM8 by the operation of the second clutch C2, the third shaft TM3 is connected with the seventh shaft TM7 by the operation of the fourth clutch C4, and the torque of the input shaft IS is input to the second shaft TM2 and the fifth shaft TM5.

Then, the TM1 acts as a fixed element, thereby realizing the forward fifth speed by cooperative operation of respective shafts and outputting a shifted torque to the output shaft OS fixedly connected with the tenth shaft TM10.

[The Forward Sixth Speed]

In the forward sixth speed D6, the first, second, and third clutches C1, C2, and C3 are simultaneously operated.

As a result, the third planetary gear set PG3 integrally rotates by the operation of the third clutch C3, the second shaft TM2 is connected with the fifth shaft TM5 by the operation of the first clutch C1, the second shaft TM2 is connected with the eighth shaft TM8 by the operation of the second clutch C2, and the torque of the input shaft IS is input to the second shaft TM2 and the fifth shaft TM5.

Then, the TM1 acts as a fixed element, thereby realizing the forward sixth speed by cooperative operation of respective shafts and outputting a shifted torque to the output shaft OS fixedly connected with the tenth shaft TM10.

[The Forward Seventh Speed]

In the forward seventh speed D7, the first, third, and fourth clutches C1, C3, and C4 are simultaneously operated.

As a result, the third planetary gear set PG3 integrally rotates by the operation of the third clutch C3, the second shaft TM2 is connected with the fifth shaft TM5 by the operation of the first clutch C1, the third shaft TM3 is connected with the seventh shaft TM7 by the operation of the fourth clutch C4, and the torque of the input shaft IS is input to the second shaft TM2 and the fifth shaft TM5.

Then, the TM1 acts as a fixed element, thereby realizing the forward seventh speed by cooperative operation of respective shafts and outputting a shifted torque to the output shaft OS fixedly connected with the tenth shaft TM10.

[The Forward Eighth Speed]

In the forward eighth speed D8, the first and third clutches C1 and C3 and the first brake B1 are simultaneously operated.

As a result, the third planetary gear set PG3 integrally rotates by the operation of the third clutch C3, the second shaft TM2 is connected with the fifth shaft TM5 by the operation of the first clutch C1, and the torque of the input shaft IS is input to the second shaft TM2 and the fifth shaft TM5.

Then, while the TM1 is always acting as a fixed element, the eighth shaft TM8 acts as a fixed element by the operation of the first brake B1, thereby realizing the forward eighth speed by cooperative operation of respective shafts and outputting a shifted torque to the output shaft OS fixedly connected with the tenth shaft TM10.

[The Forward Ninth Speed]

In the forward ninth speed D9, the first and fourth clutches C1 and C4 and the first brake B1 are simultaneously operated.

As a result, the second shaft TM2 is connected with the fifth shaft TM5 by the operation of the first clutch C1, the third shaft TM3 is connected with the seventh shaft TM7 by the operation of the fourth clutch C4, and the torque of the input shaft IS is input to the second shaft TM2 and the fifth shaft TM5.

Then, while the TM1 is always acting as a fixed element, the eighth shaft TM8 acts as a fixed element by the operation of the first brake B1, thereby realizing the forward ninth speed by cooperative operation of respective shafts and outputting a shifted torque to the output shaft OS fixedly connected with the tenth shaft TM10.

[The Reverse Speed]

In the reverse speed REV, the fourth clutch C4 and the first and second brakes B1 and B2 are simultaneously operated.

As a result, the third shaft TM3 is connected with the seventh shaft TM7 by the operation of the fourth clutch C4, and the torque of the input shaft IS is input to the second shaft TM2.

Then, while the TM1 is always acting as a fixed element, the eighth shaft TM8 and the eleventh shaft TM11 act as fixed elements by the operation of the first and second brakes B1 and B2, thereby realizing the reverse speed by cooperative operation of the shafts and outputting a reverse torque through the output shaft OS fixedly connected with the tenth shaft TM10.

FIG. 2 shows gear ratios calculated under the condition that the gear ratio of the first ring gear R1/the first sun gear S1 is 2.60, the gear ratio of the second ring gear R2/the second sun gear S2 is 2.41, the gear ratio of the third ring gear R3/the third sun gear S3 is 2.22, the gear ratio of the fourth ring gear R4/the fourth sun gear S4 is 2.13, the gear ratio of the first transfer driven gear TF1b/the first transfer drive gear TF1a is 1.01, and the gear ratio of the second transfer driven gear TF2b/the second transfer drive gear TF2a is 1.01.

Figure 3:
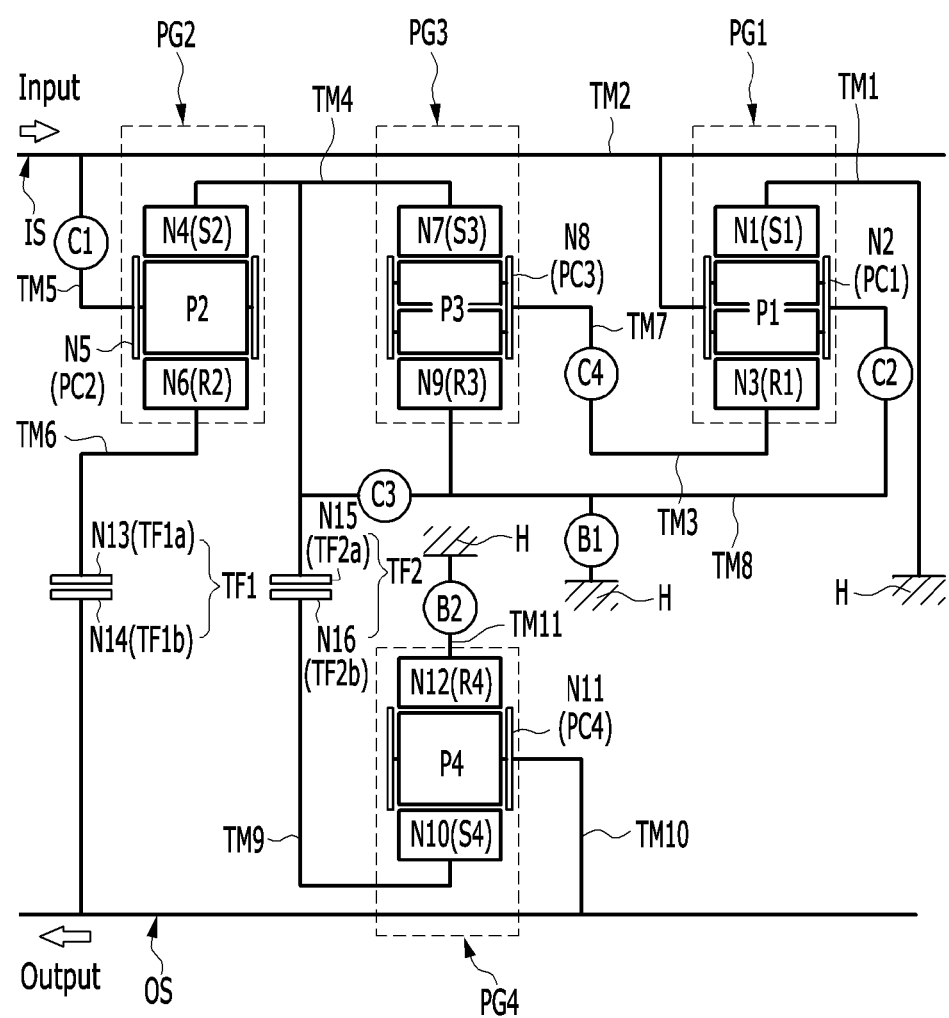
FIG. 3 is a schematic diagram of a planetary gear train according to a second exemplary form of the present disclosure.

FIG. 3 is a schematic diagram of a planetary gear train according to a second exemplary form of the present disclosure.

In a planetary gear train according to a first exemplary form of the present disclosure shown in FIG. 1, the third clutch C3 enforcing the third planetary gear set PG3 to integrally rotate is arranged between the fourth shaft TM4 and the seventh shaft TM7. However, referring to FIG. 3, the third clutch C3 is arranged between the fourth shaft TM4 and the eighth shaft TM8 in a planetary gear train according to a second exemplary form.

As a result, the second exemplary form merely differs from a planetary gear train according to a first exemplary form in the location of the third clutch C3, and maintains operation and function of the first exemplary form, which is therefore not described in further detail.

Figure 4:
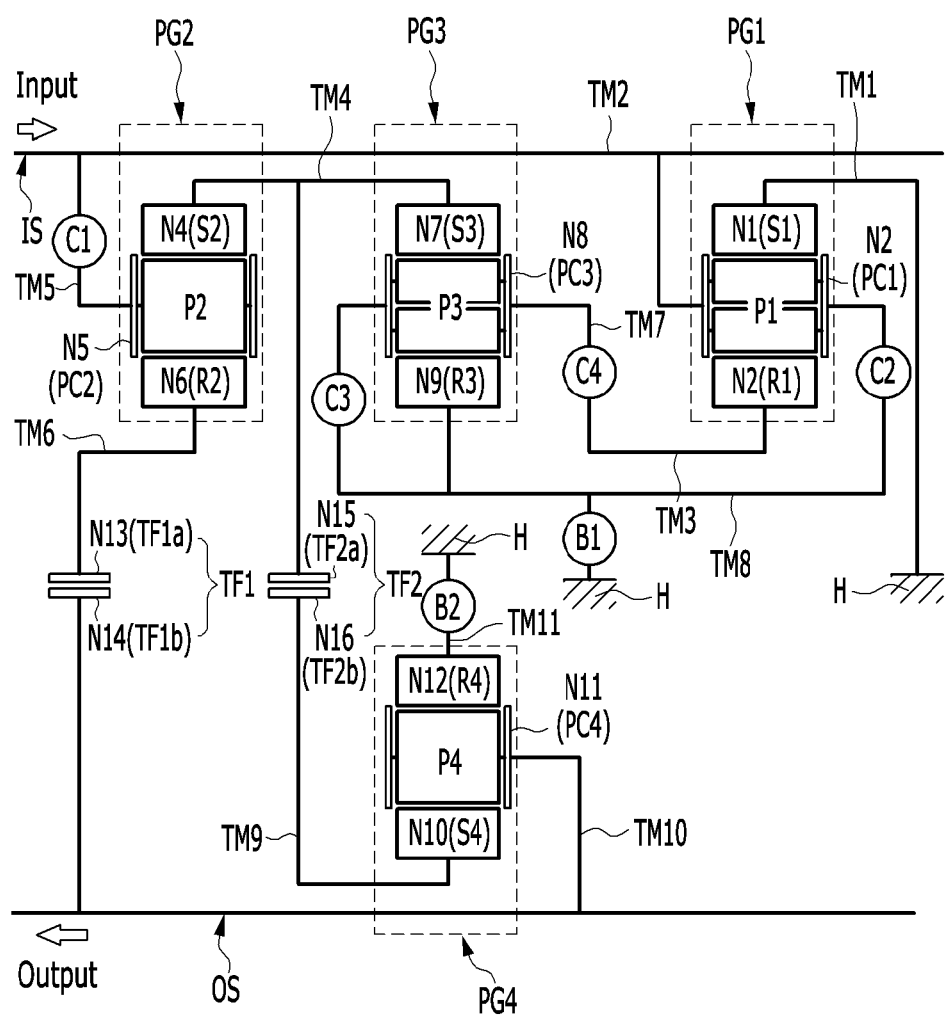
FIG. 4 is a schematic diagram of a planetary gear train according to a third exemplary form of the present disclosure.

FIG. 4 is a schematic diagram of a planetary gear train according to a third exemplary form of the present disclosure.

In a planetary gear train according to a first exemplary form of the present disclosure shown in FIG. 1, the third clutch C3 enforcing the third planetary gear set PG3 to integrally rotate is arranged between the fourth shaft TM4 and the seventh shaft TM7. However, referring to FIG. 4, the third clutch C3 is arranged between the seventh shaft TM7 and the eighth shaft TM8 in a planetary gear train according to a third exemplary form.

As a result, the third exemplary form merely differs from a planetary gear train according to a first exemplary form in the location of the third clutch C3, and maintains operation and function of the first exemplary form, which is therefore not described in further detail.

In the above description, first to third exemplary forms have been described with reference to FIG. 1 to FIG. 4. Drawings for respective forms illustrate directions of torque input and torque output. However, it should be understood that when the direction of torque input and/or torque output are reversely changed, the change in the direction of torque input and/or torque output does not affect the operation of the exemplary planetary gear train, since the same rotation elements act as input elements and output elements at respective shift-stages. For example, when the direction of torque input is changed to the direction of from the right side to the left in the case that an original form discloses the direction of torque input as from the left side to the right, all functions and operations of a planetary gear train remains the same. Thus, it should be understood that respective forms described above may include a variation where the directions of torque input and torque output of the planetary gear train is changed.

As described above, according to a planetary gear train according to an exemplary form of the present disclosure, at least nine forward speeds and at least one reverse speed may be realized by a combination of four planetary gear sets, two transfer gears, and five or six engagement elements, thereby providing improvement of power delivery performance and fuel consumption and improving installability by shortening the length of an automatic transmission.

In addition, according to a planetary gear train according to an exemplary form of the present disclosure, two transfer gears of external gears arranged on the output shaft OS are employed in addition to three planetary gear sets, and thus, gear teeth may be widely varied so as to easily achieve desired gear ratio and to easily comply with desired performance for respective vehicles.

In addition, according to a planetary gear train according to an exemplary form of the present disclosure, a gear ratio span of more than 8.7 may be achieved while realizing at least nine forward speeds and at least one reverse speed, thereby increasing an engine driving efficiency.

In addition, the linearity of step ratios of shift stages is secured while multi-staging the shift stage with high efficiency, thereby making it possible to improve drivability such as acceleration before and after a shift, an engine speed rhythmic sense, and the like.

While this present disclosure has been described in connection with what is presently considered to be practical exemplary forms, it is to be understood that the present disclosure is not limited to the disclosed forms, but, on the contrary, is intended to cover various modifications and equivalent arrangements included within the spirit and scope of the present disclosure.

<Description of Symbols>

PG1, PG2, PG3, PG4: first, second, third, and fourth planetary gear sets
S1, S2, S3, S4: first, second, third, and fourth sun gears
PC1, PC2, PC3, PC4: first, second, third, and fourth planet carriers
R1, R2, R3, R4: first, second, third, and fourth ring gears
IS: input shaft
OS: output shaft
B1, B2: first and second brakes
C1, C2, C3, C4: first, second, third, and fourth clutches
TF1, TF2: first and second transfer gears
TM1, TM2, TM3, TM4, TM5, TM6, TM7, TM8, TM9, TM10, TM11: first, second, third, fourth, fifth, sixth, seventh, eighth, ninth, tenth, and eleventh shaft

What is claimed is:

1. A planetary gear train of an automatic transmission for a vehicle, the planetary gear train comprising:
   a first planetary gear set having first, second, and third rotational elements;
   a second planetary gear set having fourth, fifth, and sixth rotational elements;
   a third planetary gear set having seventh, eighth, and ninth rotational elements;
   a fourth planetary gear set having tenth, eleventh, and twelfth rotational elements;
   a first externally-engaged gear set having thirteenth and fourteenth rotational elements;
   a second externally-engaged gear set having fifteenth and sixteenth rotational elements;
   an input shaft disposed coaxial with the first, second, and third planetary gear sets; and
   an output shaft disposed in parallel with the input shaft and coaxial with the fourth planetary gear set,
   wherein the second rotational element is fixedly connected with the input shaft,
   the fourth rotational element and the seventh rotational element are connected with the tenth rotational element through the second externally-engaged gear set,
   the sixth rotational element is connected with the eleventh rotational element through the first externally-engaged gear set, and
   the eleventh rotational element being fixedly connected with the output shaft.

2. The planetary gear train of claim 1, further comprising:
   a first shaft fixedly connected with the first rotational element and fixedly connected with a transmission housing;
   a second shaft fixedly connected with the second rotational element and the input shaft;
   a third shaft fixedly connected with the third rotational element;
   a fourth shaft fixedly connected with the fourth rotational element, the seventh rotational element, and the fifteenth rotational element;
   a fifth shaft fixedly connected with the fifth rotational element;
   a sixth shaft fixedly connected with the sixth rotational element and the thirteenth rotational element;
   a seventh shaft fixedly connected with the eighth rotational element;
   an eighth shaft fixedly connected with the ninth rotational element;
   a ninth shaft fixedly connected with the tenth rotational element and the sixteenth rotational element;
   a tenth shaft fixedly connected with the eleventh rotational element, the fourteenth rotational element, and the output shaft; and
   an eleventh shaft fixedly connected with the twelfth rotational element.

3. The planetary gear train of claim 2, wherein
   the second shaft is selectively connected with the fifth shaft and the eighth shaft respectively;
   the third shaft is selectively connected with the seventh shaft;
   the eighth shaft is selectively connected with the transmission housing; and
   the eleventh shaft is selectively connected with the transmission housing.

4. The planetary gear train of claim 3, wherein two shafts selected from the fourth shaft, the seventh shaft, and the eighth shaft are selectively interconnected, such that the third planetary gear set integrally rotates when the selected two shafts are connectedly operated.

5. The planetary gear train of claim 4, further comprising:
   a first clutch arranged between the second shaft and the fifth shaft;
   a second clutch arranged between the second shaft and the eighth shaft;
   a third clutch arranged between the fourth shaft and the seventh shaft;
   a fourth clutch arranged between the third shaft and the seventh shaft;
   a first brake arranged between the eighth shaft and the transmission housing; and a second brake arranged between the eleventh shaft and the transmission housing.

6. The planetary gear train of claim 4, further comprising:
a first clutch arranged between the second shaft and the fifth shaft;
a second clutch arranged between the second shaft and the eighth shaft;
a third clutch arranged between the fourth shaft and the eighth shaft;
a fourth clutch arranged between the third shaft and the seventh shaft;
a first brake arranged between the eighth shaft and the transmission housing; and
a second brake arranged between the eleventh shaft and the transmission housing.

7. The planetary gear train of claim 4, further comprising:
a first clutch arranged between the second shaft and the fifth shaft;
a second clutch arranged between the second shaft and the eighth shaft;
a third clutch arranged between the seventh shaft and the eighth shaft;
a fourth clutch arranged between the third shaft and the seventh shaft;
a first brake arranged between the eighth shaft and the transmission housing; and
a second brake arranged between the eleventh shaft and the transmission housing.

8. The planetary gear train of claim 1, wherein
the first planetary gear set includes a first sun gear as the first rotational element, a first planet carrier as the second rotational element, and a first ring gear as the third rotational element;
the second planetary gear set includes a second sun gear as the fourth rotational element, a second planet carrier as the fifth rotational element, and a second ring gear as the sixth rotational element;
the third planetary gear set includes a third sun gear as the seventh rotational element, a third planet carrier as the eighth rotational element, and a third ring gear as the ninth rotational element; and
the fourth planetary gear set includes a fourth sun gear as the tenth rotational element, a fourth planet carrier as the eleventh rotational element, and a fourth ring gear as the twelfth rotational element.

9. The planetary gear train of claim 8, wherein
the first planetary gear set is a double pinion planetary gear set;
the second planetary gear set is a single pinion planetary gear set;
the third planetary gear set is a double pinion planetary gear set; and
the fourth planetary gear set is a single pinion planetary gear set.

10. The planetary gear train of claim 1, wherein the first, second, and third planetary gear sets are arranged on the input shaft in the order of the first, third, and second planetary gear sets.

11. The planetary gear train of claim 1, wherein the fourth planetary gear set and the third planetary gear set are arranged at an axially same side with respect to the first and second externally-engaged gear sets.

12. A planetary gear train of an automatic transmission for a vehicle, the planetary gear train comprising:
a first planetary gear set having first, second, and third rotational elements;
a second planetary gear set having fourth, fifth, and sixth rotational elements;
a third planetary gear set having seventh, eighth, and ninth rotational elements;
a fourth planetary gear set having tenth, eleventh, and twelfth rotational elements;
an input shaft mounted with the first, second, and third planetary gear sets on an external circumference of the input shaft; and
an output shaft disposed in parallel with the input shaft and mounted with the fourth planetary gear set on an external circumference of the output shaft,
wherein the first rotational element is fixedly connected with a transmission housing,
the second rotational element is selectively connected with the fifth rotational element and the ninth rotational element, and fixedly connected with the input shaft,
the third rotational element is selectively connected with the eighth rotational element,
the fourth rotational element is fixedly connected with the seventh rotational element and externally gear-meshed with the tenth rotational element,
the sixth rotational element is externally gear-meshed with the eleventh rotational element,
the ninth rotational element is selectively connected with the transmission housing,
the eleventh rotational element is fixedly connected with the output shaft,
the twelfth rotational element is selectively connected with the transmission housing, and
two transfer gears are respectively arranged between the sixth and eleventh rotational elements and between the fourth and tenth rotational elements.

13. The planetary gear train of claim 12, wherein
the first planetary gear set includes a first sun gear as the first rotational element, a first planet carrier as the second rotational element, and a first ring gear as the third rotational element;
the second planetary gear set includes a second sun gear as the fourth rotational element, a second planet carrier as the fifth rotational element, and a second ring gear as the sixth rotational element;
the third planetary gear set includes a third sun gear as the seventh rotational element, a third planet carrier as the eighth rotational element, and a third ring gear as the ninth rotational element; and
the fourth planetary gear set includes a fourth sun gear as the tenth rotational element, a fourth planet carrier as the eleventh rotational element, and a fourth ring gear as the twelfth rotational element.

14. The planetary gear train of claim 12, wherein two rotational elements selected from the seventh, eighth, and ninth rotational elements are selectively interconnected, such that the third planetary gear set integrally rotates when the selected two rotational elements are engaged.

15. The planetary gear train of claim 12, wherein the two transfer gears comprises:
a first transfer gear including a thirteenth rotational element fixedly connected with the sixth rotational element and a fourteenth rotational element fixedly connected with the eleventh rotational element; and
a second transfer gear including a fifteenth rotational element fixedly connected with the fourth rotational element and a sixteenth rotational element fixedly connected with the tenth rotational element.

16. The planetary gear train of claim 14, further comprising:

a first clutch selectively connecting the second rotational element and the fifth rotational element;

a second clutch selectively connecting the second rotational element and the ninth rotational element;

a third clutch selectively connecting the seventh rotational element and the eighth rotational element;

a fourth clutch selectively connecting the third rotational element and the eighth rotational element;

a first brake selectively connecting the ninth rotational element and the transmission housing; and a second brake selectively connecting the twelfth rotational element and the transmission housing.

17. The planetary gear train of claim 14, further comprising:

a first clutch selectively connecting the second rotational element and the fifth rotational element;

a second clutch selectively connecting the second rotational element and the ninth rotational element;

a third clutch selectively connecting the seventh rotational element and the ninth rotational element;

a fourth clutch selectively connecting the third rotational element and the eighth rotational element;

a first brake selectively connecting the ninth rotational element and the transmission housing; and a second brake selectively connecting the twelfth rotational element and the transmission housing.

18. The planetary gear train of claim 14, further comprising:

a first clutch selectively connecting the second rotational element and the fifth rotational element;

a second clutch selectively connecting the second rotational element and the ninth rotational element;

a third clutch selectively connecting the eighth rotational element and the ninth rotational element;

a fourth clutch selectively connecting the third rotational element and the eighth rotational element;

a first brake selectively connecting the ninth rotational element and the transmission housing; and a second brake selectively connecting the twelfth rotational element and the transmission housing.

19. The planetary gear train of claim 12, wherein the first, second, and third planetary gear sets are arranged on the input shaft in the order of the first, third, and second planetary gear sets.

20. The planetary gear train of claim 12, wherein the fourth planetary gear set and the third planetary gear set are arranged at an axially same side with respect to the two transfer gears.

* * * * *